United States Patent [19]

Mukawa

[11] Patent Number: 5,243,933
[45] Date of Patent: Sep. 14, 1993

[54] PLASTIC INTAKE PIPE AND THE METHOD THEREOF

[75] Inventor: Tatsuhiko Mukawa, Higashi-kurume, Japan

[73] Assignee: Fuji Jukogyo Kabushiki Kaisha, Tokyo, Japan

[21] Appl. No.: 998,735

[22] Filed: Dec. 30, 1992

[30] Foreign Application Priority Data

Feb. 5, 1992 [JP] Japan .................................. 4-20172

[51] Int. Cl.$^5$ ............................................. F02B 75/18
[52] U.S. Cl. ........................... 123/52 M; 123/52 MC; 264/259
[58] Field of Search .................. 123/52 MC, 52 M; 264/259, 250, 513, 516

[56] References Cited

U.S. PATENT DOCUMENTS

| 3,875,918 | 4/1975 | Loynd | 123/52 M |
|---|---|---|---|
| 4,743,481 | 5/1988 | Quinlan et al. | 264/259 |
| 4,776,313 | 10/1988 | Freismuth et al. | 123/52 M |
| 4,903,645 | 2/1990 | Borger | 123/52 MC |
| 5,138,983 | 8/1992 | Daly | 123/52 MC |

Primary Examiner—E. Rollins Cross
Assistant Examiner—M. Macy
Attorney, Agent, or Firm—Beveridge, DeGrandi, Weilacher & Young

[57] ABSTRACT

A plastic intake pipe for an internal combustion engine, has an inside pipe provided in the plastic intake pipe and formed integrally from the intake duct portion to the intake manifold portion, a supporting member inserted in the inside pipe for supporting an inside wall of the inside pipe for fixing the intake duct portion and the intake chamber, and an outside pipe for entirely covering the inside pipe. The intake pipe prevents itself from deforming and damaging while assembling in the internal combustion engine and provides a simple structure for handling. A method of producing the plastic intake pipe forms integrally an inside pipe of the intake pipe body having an intake duct portion, an intake chamber portion connected to a downstream side of the intake duct portion, and an intake manifold portion connected to a downstream side of the intake chamber portion, then fixes at least the intake chamber and the intake duct portion of the inside pipe by a supporting member, thereafter inserts the inside pipe in a cavity mold, and forms an outside pipe on the outer periphery of the inside pipe by injection-molding the plastic material in the mold. Hence production and handling are easy, and an intake noise can be reduced.

12 Claims, 5 Drawing Sheets

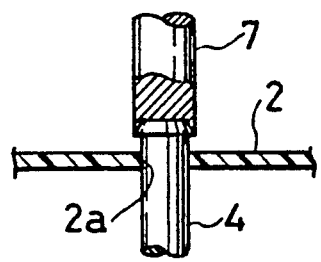
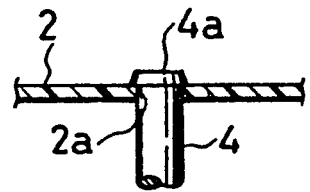
FIG.7a  FIG.7b
FIG.8
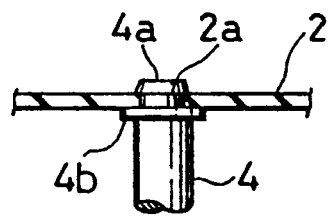
FIG.9
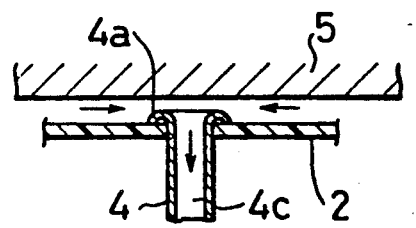

PLASTIC INTAKE PIPE AND THE METHOD THEREOF

BACKGROUND OF THE INVENTION

The present invention relates to a plastic intake pipe and a method of producing the same for use in vehicles such as automobiles.

In general, an intake pipe connected to a downstream side of a throttle valve is composed of an intake duct portion, an intake chamber portion and an intake manifold portion.

Heretofore, these components and parts are divisionally formed, and associated integrally in later steps. In case of a plastic intake pipe, portions of the intake pipe which are not required for high strengths, are formed by blow molding, thick portions such as flanges, are partially formed by injection-molding, and the blow-molded portion is fusion-connected to the injection-molded portion in a later step. An intake manifold portion having relatively many bent parts is formed by using a low melting point metal material such as a bismuth alloy as a core, and the core is melted and then drawn out after the intake manifold portion is injection-molded.

As explained above, an arbitrary shape can be obtained by the blow molding, but since the flange or a bracket to be externally mounted cannot be formed integrally by the blow molding, there is a problem in fixing means when the body is externally mounted. In case where a flange or a bracket is fusion-connected to the blow-molded portion later, it is necessary to widely obtain its fusion-connected surface by considering reliability for a strength of the fusion-connected part thereby to cause an unnecessary space to be increased.

On the other hand, if a low melting point alloy is used as a core likewise a molding of an intake manifold portion, a flange or a bracket may be formed integrally, but since the low melting point alloy is expensive, it introduces an increase in its cost. Further, since it additionally needs a facility for molding the core, its facility cost is not only increased, but also it causes its productivity to be remarkably decreased.

In order to solve such a problem, techniques for first forming an inside pipe by blow molding and then injection-molding an outside pipe on the outer periphery of the inside pipe with the inside pipe used as a core have been disclosed, for example, in Japanese Patent Application laid-open Nos. 63-111031 and 63-141713 official gazettes.

Since it is apprehended that the blow-molded component likewise the inside pipe used as a core in this prior art as explained above is deformed by a molding pressure in a mold in case of an injection-molding, a non-compressive material (such as sand, glass beads, liquid likewise water) must be filled in the blow-molded component.

However, a great deal of labor is required for works of sealing the noncompressive material in the blow-molded component, its operation is not only complicated, but also the noncompressive material must be heated and drawn out after the injection-molding is completed thereby to cause the working steps to be increased.

Further, when the noncompressive material is filled in the blow-molded component, the weight of the component is increased, and it becomes difficult to hold and fix the material at an accurate position in case of inserting the material in an injection mold. Accordingly, it is difficult to mold an entire intake system integrally at a downstream side of a throttle valve. As disclosed in the prior art explained above, it cannot be realized only by partially molding the intake duct portion or the intake manifold portion, but a work of connecting the components and parts is additionally required to cause the number of steps for connecting the components and parts to be increased. Moreover, a guarantee for the strengths of the connecting portions of the components and parts must be sufficiently considered.

There is another problem that the afore-described blow-molded components have a low rigidity. When the intake pipe body having the blow-molded component as the inside pipe is assembled in an intake system of an internal combustion engine, the inside pipe is elastically deformed by pressure fluctuation of the intake air which flows in the intake pipe to induce a surface vibration and thereby to cause noise to be increased.

SUMMARY OF THE INVENTION

An object of the present invention is to provide a plastic intake pipe where a structure is simple, the number of components and parts can be reduced, and a rigidity of the components and parts can be sufficiently guaranteed.

In order to achieve the above-described object, there is provided a plastic intake pipe for an internal combustion engine, having an intake duct portion for inducing air into the engine, an intake chamber portion connected to the intake duct portion for decreasing pulsation of an air flow, and an intake manifold portion connected to the intake chamber for supplying the air into the engine, an improvement of the plastic intake pipe which comprises an inside pipe provided in the plastic intake pipe and formed integrally from the intake duct portion to the intake manifold portion; a supporting member inserted in the inside pipe for supporting an inside wall of the inside pipe for fixing the intake duct portion and the intake chamber; and an outside pipe for entirely covering the inside pipe so as to prevent the plastic pipe from deforming and damaging while assembling in the internal combustion engine and to obtain a simple structure for handling.

Another object of the present invention is to provide a method of producing a plastic intake pipe. Therefore, the number of components and parts and the number of assembling steps can be reduced in a simple structure. The production and handling become easy, and a rigidity of the components and parts can be sufficiently guaranteed even after the components and parts are associated. Further, an intake noise can be reduced.

In order to achieve the above-described object, a method of producing a plastic intake pipe according to the present invention forms integrally an inside pipe of an intake pipe body having an intake duct portion, an intake chamber portion connected to a downstream side of the intake duct portion, and an intake manifold portion connected to a downstream side of the intake chamber portion, then fixes at least the intake chamber and the intake duct portion of the inside pipe by a supporting member, thereafter inserts the inside pipe in a cavity mold, and forms an outside pipe on the outer periphery of the inside pipe by injection-molding the plastic material in the mold.

According to a plastic intake pipe in accordance with the present invention, the inside pipe of the plastic intake pipe is formed integrally from the intake duct portion to the intake manifold portion, the supporting member inserted in the inside pipe supports the inside pipe to fix the intake duct portion and the intake chamber, and the outside pipe entirely covers the inside pipe. Hence, the plastic intake pipe is prevented from being deformed and damaged while the intake pipe is assembled in an internal combustion engine.

According to a method of producing an intake pipe in accordance with the present invention, at least the intake chamber portion and the intake duct portion of the blow-molded inside pipe are fixed by the supporting member. Hence even if the inside pipe is inserted in an injection mold as it is, the intake chamber and the intake duct portion which are relatively weak in strengths are not deformed by a molding pressure. Therefore, in case of the injection-molding, it is not necessary to fill a noncompressive material in the inside pipe, the inside pipe is lighter in weight in the amount corresponding to the quantity of the noncompressive material, and hence the fixture of the inside pipe to the position in the mold at the time of inserting the inside pipe is easy. Hence the entire intake pipe can be injection-molded integrally.

Since the rigidity of the inside pipe can be enhanced by the supporting member, the inside pipe is not elastically deformed even by a negative pressure of the intake pipe at the time of operating an internal combustion engine, and an intake noise can be reduced.

These and other objects and features of the present invention will become understood from the following description with reference to the accompanying drawings.

BRIEF DESCRIPTION OF THE DRAWINGS

FIGS. 7(a) and 7(b) are sectional views showing fixing steps of a pillar used in the intake pipe of the embodiment;

FIG. 8 is a sectional view showing a pillar; or a second embodiment and

FIG. 9 is a sectional view showing a pillar of a third embodiment.

DETAILED DESCRIPTION OF THE PREFERRED EMBODIMENTS

The embodiments of the present invention is explained referring to the accompanying drawings. The first embodiment of the present invention is shown in FIGS. 1 to 6.

Figure 1:
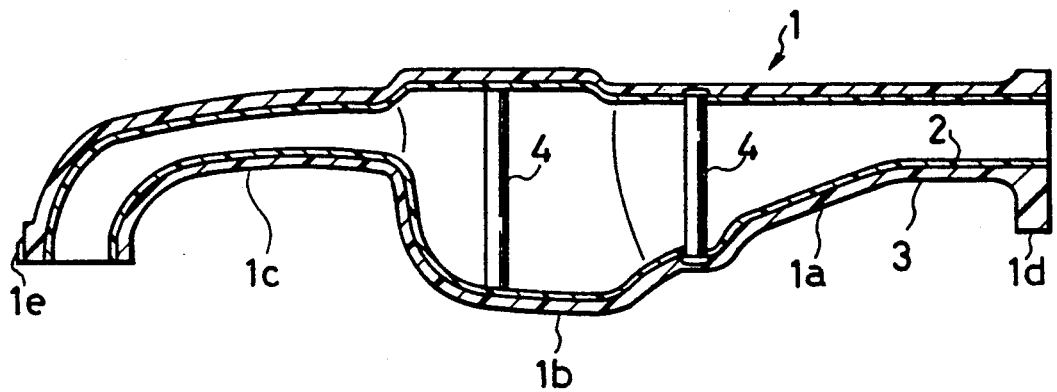
FIG. 1 is a sectional view of the first embodiment of a plastic intake pipe according to the present invention, taken along the line I—I of FIG. 2.

In FIG. 1, numeral 1 indicates an intake pipe body. The intake pipe body 1 is formed in a two-layer structure having an inside pipe 2 and an outside pipe 3 surrounding the inside pipe 2. The intake pipe body 1 has an intake duct portion 1a connected to a downstream side of a throttle valve (not shown), an intake chamber portion 1b connected to the intake duct portion 1a, and an intake manifold portion 1c connected to a downstream side of the intake chamber portion 1b, sequentially shown from the right side of FIG. 1, which portions are formed integrally.

A pillar 4 is interposed between the intake duct portion 1a and the intake chamber 1b of the portions having relatively large volumes, i.e., being weak in strengths of the inside pipe 2, as shown in FIG. 1, 2, 4 and 5. The pillar 4 is made from a plastic. Both the ends of the pillar 4 are inserted to holes 2a (FIG. 5) perforated at the inside pipe 2, thermally deformed to form heads 4a (FIGS. 4 and 5), fusion-connected at lower portions of the heads 4a to the inside pipe 2, and caulked. Further, flanges 1d and 1e (FIGS. 1, 2 and 3) are respectively formed at an inlet of the intake duct portion 1a and an outlet of the intake manifold portion 1c of the outside pipe 3.

Figure 2:
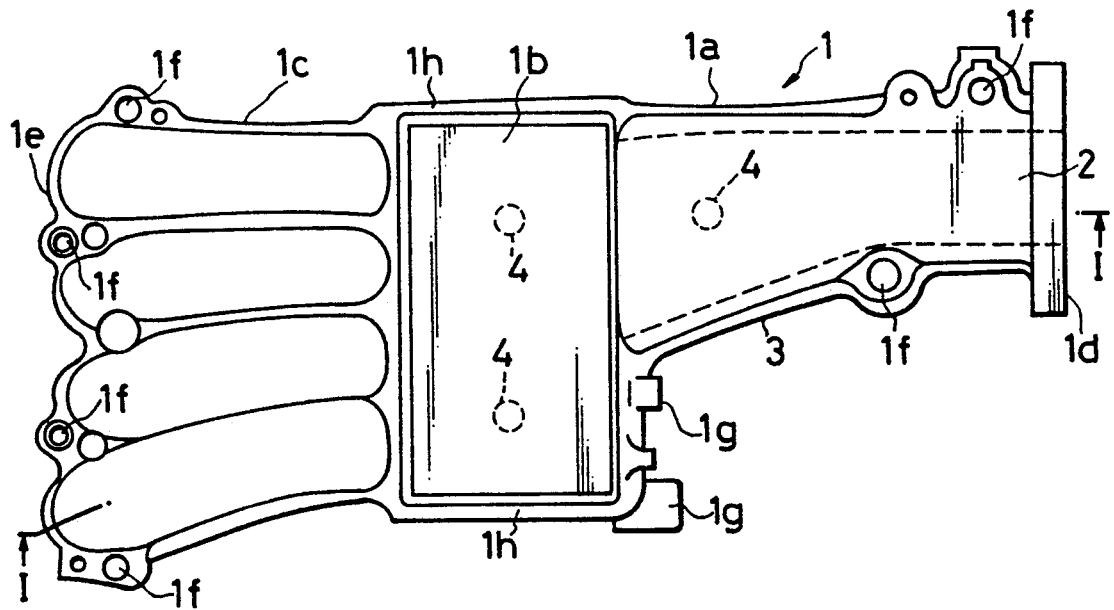
FIG. 2 is a plan view of an entire intake pipe of the embodiment.

Holes 1f for fixing the intake pipe body 1 are opened at predetermined positions of the outside pipe 3, and bosses 1g for fixing auxiliary equipments are formed integrally to a side face of the intake chamber portion 1b of the outside pipe 3 as shown in FIG. 2. Further, ribs 1h are formed integrally to the side of the outside pipe therealong in a lengthwise direction, as also shown in FIG. 2.

Figure 6:
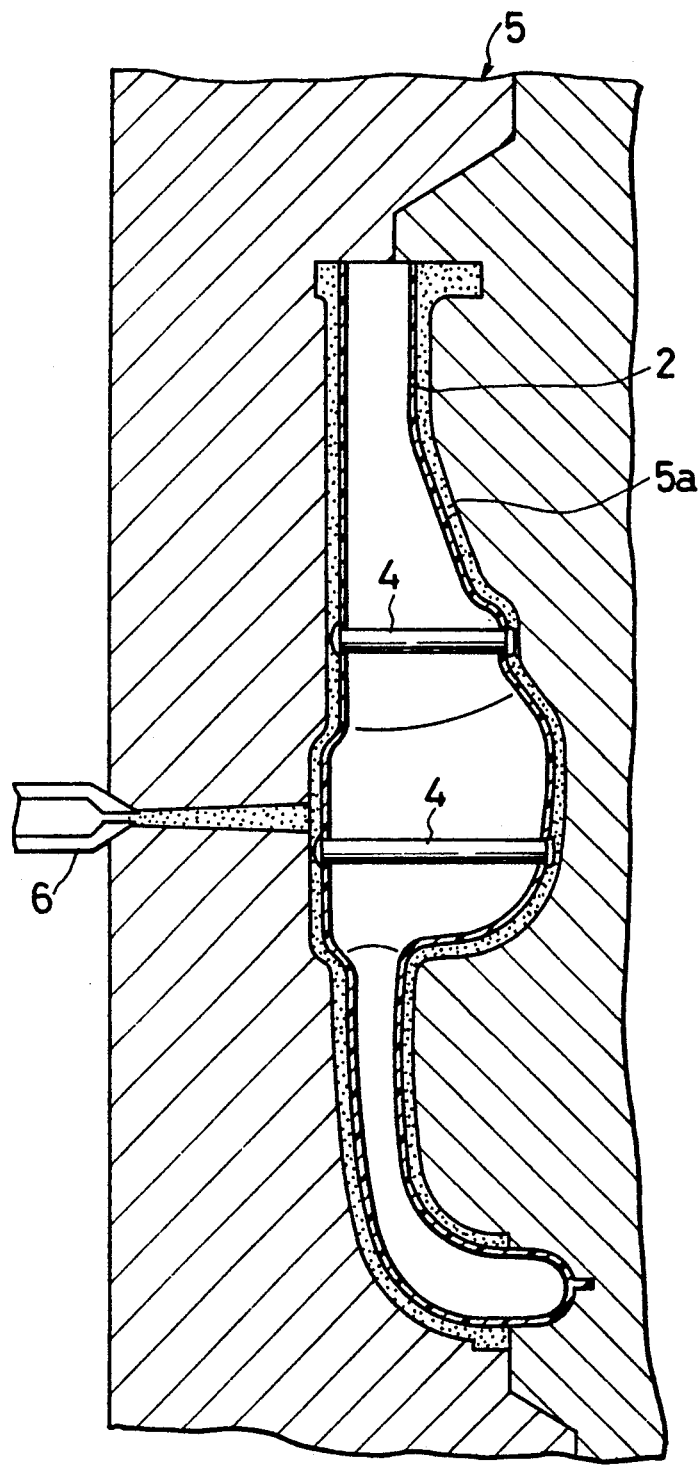
FIG. 6 is a sectional view of a mold for use in molding the intake pipe of the embodiment.

The inside pipe 2 is made from a thermoplastic resin, or a plastic and formed by blow molding. The outside pipe 3 is injection-molded in a cavity 5a of a mold 5, as shown in FIG. 6.

A producing sequence of the intake pipe body 1 of the structure as explained above is described.

The inside pipe 2 made from a thermoplastic resin or a plastic is first formed by blow molding. Then, the holes 2a are opened at preset positions of opposed surfaces of the intake chamber 1b and the intake duct portion 1a of the inside pipe 2, and the pillar 4 made from the plastic is inserted at both ends thereof to the holes 2a. Both the ends of the pillar 4 are projected from the respective holes 2a, and heads 4a are formed at both the ends of the pillar 4. As shown in FIG. 7, the heads 4a are deformed by applying heat or an ultrasonic wave by a caulking tool 7, and the heads 4a of the pillar 4 are fusion-connected at the lower portions thereof to the inside pipe 2 at the same time as the deformations of the heads 4a.

Then, the inside pipe 2 is inserted in a cavity 5a of the mold 5, and positioned fixedly at a predetermined position therein. The mold 5 is then clamped, and a plastic is injected from an injector 6 (FIG. 6). At this time, since a portion having a weak strength of the inside pipe 2 is reinforced by the pillar 4, the portion of the inside pipe 2 is scarcely deformed, even if it is effected by a molding pressure, to provide an excellent pressure durability. Hence it is not necessary to fill noncompressive material in the inside pipe 2 as in a prior art but provides a preferable operability.

Figure 3:
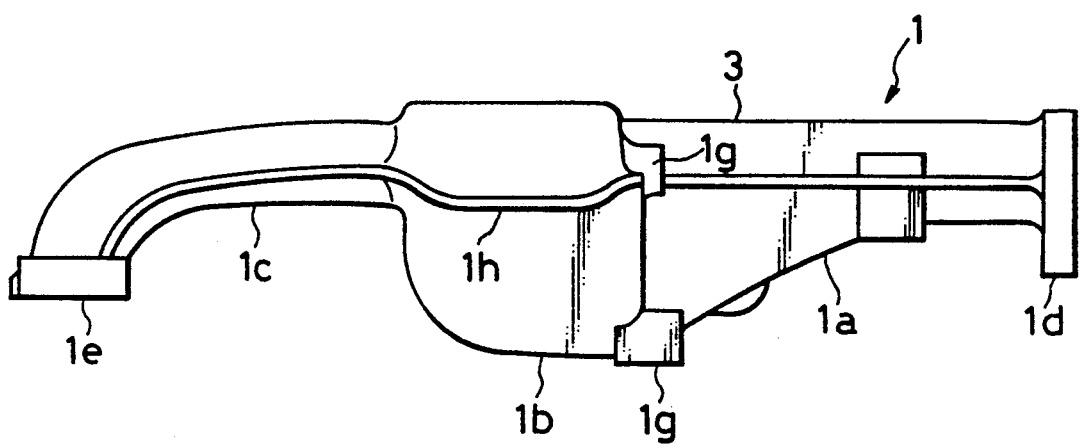
FIG. 3 is a side view of the embodiment shown in FIG. 2.
Figure 4:
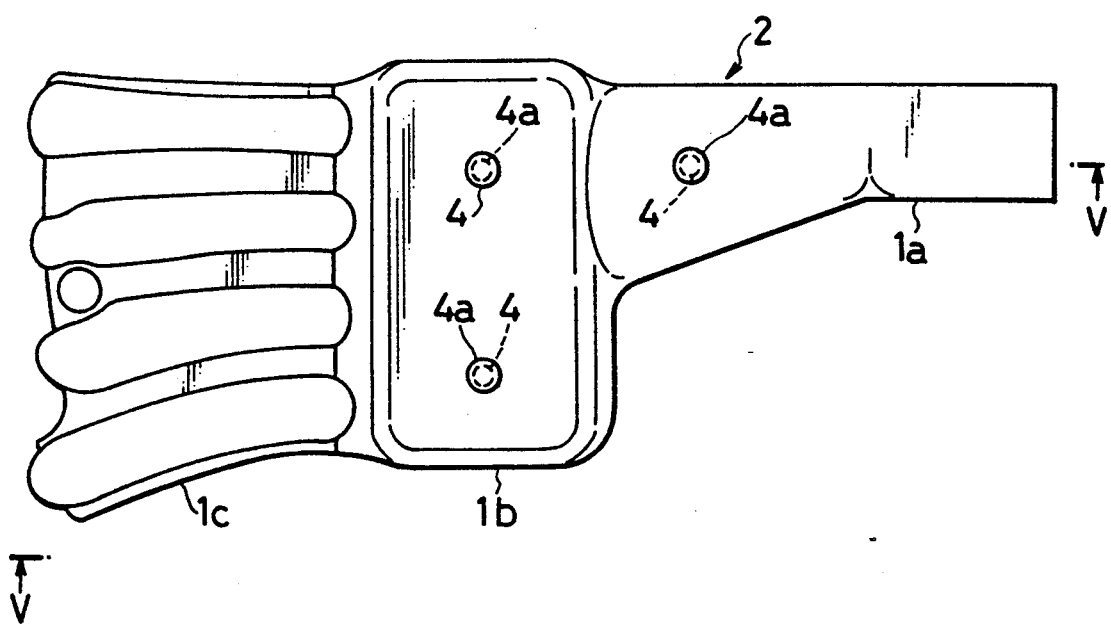
FIG. 4 is a plan view of an inside pipe of the intake pipe of the embodiment.
Figure 5:
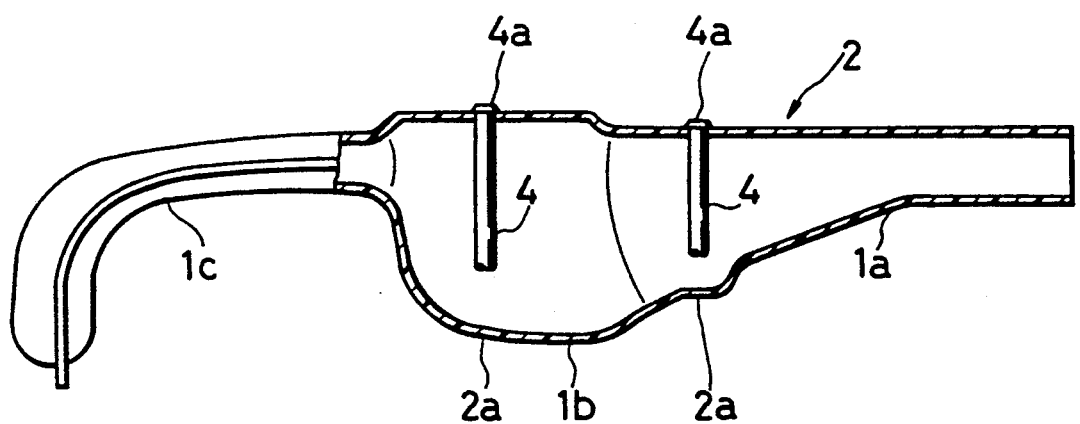
FIG. 5 is a sectional view taken along the line V—V of FIG. 4.

When the outside pipe 3 is injection-molded on the outer periphery of the inside pipe 2 in the mold 5, the mold 5 is opened, the molded component or product is drawn out, finished as predetermined to obtain the intake pipe body 1 as shown in FIGS. 2 and 3. Since the inside pipe 2 used as a core in case of injection-molding is light in weight, the inside pipe 2 can be readily positioned and held in the mold.

Since the portion having a weak strength of the inside pipe 2 is reinforce by the pillar 4 when the intake pipe body 1 is associated in the internal combustion engine, the rigidity of the entire product is raised, the pressure durability of the inside pipe 2 against pressure fluctuation of the intake air which flows in the intake pipe is improved, and its surface fluctuation is suppressed. As a result, an intake noise of the intake pipe is reduced.

As shown the second embodiment is in FIG. 8, when flanges 4b contacted with the inner wall of the inside pipe 2 are formed at both ends of the pillar 4, the rigidity of the inside pipe 2 can be further improved. As shown the third embodiment is in FIG. 9, when the pillar 4 is formed hollow, a plastic flows to a hollow portion 4c of the pillar 4 in the mold at the time of injection-molding to integrate the inside pipe 2 with the outside pipe 3, thereby improving the rigidity of the entire structure.

According to the present invention as aforedescribed, at least the intake chamber and the intake duct portion of the inside pipe blow-molded as explained above are fixed by the supporting member. Hence even if the inside pipe is inserted in the mold as it is, the intake chamber and the intake duct portion having relatively weak strength of the inside pipe are not deformed by the molding pressure. Therefore, in case of the injection-molding, it is not necessary to fill a noncompressive material in the inside pipe, and the inside pipe is reduced in weight in an amount corresponding to the noncompressive material. Hence the inside pipe can be easily positioned and fixed in the mold at the time of inserting it in the mold. As a result, the entire intake pipe can be injection-molded integrally, the number of components and parts and the number of assembling steps of the components and parts can be reduced in a simple structure, and manufacture and handling of the components and parts can be ready.

Since the rigidity of the inside pipe is raised by the supporting member, the elastic deformation of the inside pipe by the negative pressure of the intake pipe at the time of operating the internal combustion engine after the components and parts are associated in the engine is eliminated, and an intake noise can be reduced correspondingly.

While the presently preferred embodiments of the present invention has been shown and described, it is to be understood that these disclosures are for the purpose of illustration and that various changes and modifications may be made without departing from the scope of the invention as set forth in the appended claims.

What is claimed is:

1. A plastic intake pipe for an internal combustion engine, comprising:
    an outside pipe having an intake duct portion for inducing air into said engine, an intake chamber portion connected to said intake duct portion for controlling flow of said air, and an intake manifold portion connected to said intake chamber for supplying said air into said engine,
    an inside pipe provided in said outside pipe and formed integrally therein and extending from said intake duct portion to said intake manifold portion formed by blow molding;
    a supporting member inserted in said inside pipe for supporting an inside wall of said inside pipe to hold said inside pipe during forming of said outside pipe by injection-molding; and
    said outside pipe entirely covering said inside pipe so as to prevent said plastic intake pipe from deforming and becoming damaged while assembling in said internal combustion engine and to obtain a simple structure for handling.

2. A method for producing a plastic intake pipe for an internal combustion engine, comprising:
    forming an inside pipe by blowing a plastic material into a mold;
    holding an inside wall of said inside pipe with a supporting member;
    inserting said inside pipe with said supporting member in a cavity of a mold; and
    forming an outside pipe on said intake pipe entirely by injecting a plastic into said mold.

3. The method according to claim 2, wherein the holding step comprises:
    opening holes at opposed walls of said inside pipe;
    inserting said supporting member in said inside pipe through said holes; and
    deforming both ends of said supporting member to fix said supporting member at said opposed walls of said inside pipe, respectively.

4. The method according to claim 3, wherein said supporting member is made from plastic and said ends of said supporting member are deformed by one of heat and ultrasonic wave.

5. A plastic intake pipe for an internal combustion engine, comprising:
    an inside pipe formed by blow molding a plastic;
    an outer pipe formed on a periphery of said inside pipe by injection-molding a plastic; and
    supporting means inserted in said inside pipe and fixed between opposed walls of said inside pipe for preventing said inside pipe from deforming during injection molding.

6. The plastic intake pipe according to claim 5 wherein said plastic intake pipe includes an intake duct portion, an intake chamber portion connected to a downstream side of said intake duct portion and an intake manifold portion connected to a downstream side of said intake chamber portion, which portions are formed integrally.

7. The plastic intake pipe according to claim 6 wherein said supporting means includes a plurality of pillars, each of said pillars being positioned at one of said intake duct portion and said intake chamber portion.

8. The plastic intake pipe according to claim 5 wherein said supporting means includes at least one pillar having two ends to be secured on said opposed wall respectively.

9. The plastic intake pipe according to claim 8, wherein said pillar comprises flanges provided at said ends and contacted with said opposed walls, respectively, thereby to further improve the rigidity of the inside pipe.

10. The plastic intake pipe according to claim 8, wherein said pillar has a hollow space to be filled with a plastic at the time of said injection-molding.

11. The plastic intake pipe according to claim 8, wherein said pillar is made from plastic.

12. The plastic intake pipe according to claim 11, wherein said inside pipe has opposed holes to receive respective ends of said pillar, said ends being deformed by either heat or ultrasonic wave to secure said ends on said opposed walls.

* * * * *